(12) United States Patent
Sauerberg et al.

(10) Patent No.: US 12,372,131 B2
(45) Date of Patent: Jul. 29, 2025

(54) FORCE TRANSMISSION APPARATUS FOR A DISC BRAKE

(71) Applicant: ZF Active Safety GmbH, Koblenz (DE)

(72) Inventors: Jason Sauerberg, Neuhäusel (DE); Felix Hiester, Rueber (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 440 days.

(21) Appl. No.: 17/989,841

(22) Filed: Nov. 18, 2022

(65) Prior Publication Data

US 2023/0160448 A1 May 25, 2023

(30) Foreign Application Priority Data

Nov. 19, 2021 (DE) .......................... 102021213029.1

(51) Int. Cl.
| | | |
|---|---|---|
| *F16D 65/18* | (2006.01) | |
| *F16D 55/226* | (2006.01) | |
| *F16D 65/097* | (2006.01) | |

(52) U.S. Cl.
CPC ......... *F16D 65/183* (2013.01); *F16D 55/226* (2013.01); *F16D 65/0971* (2013.01)

(58) Field of Classification Search
CPC ... F16D 65/183; F16D 65/0971; F16D 55/226
USPC ......... 188/247, 250 B, 250 C, 250 D, 250 G, 188/251 M, 258
See application file for complete search history.

(56) References Cited

U.S. PATENT DOCUMENTS

| | | | | |
|---|---|---|---|---|
| 10,851,857 | B2* | 12/2020 | Baumgartner | .......... F16D 65/18 |
| 11,230,275 | B2* | 1/2022 | Smith | .................... B62D 5/046 |
| 11,867,244 | B2* | 1/2024 | Bourlon | ............... F16D 55/227 |
| 11,971,075 | B1* | 4/2024 | Oberdorfer | .......... F16D 65/183 |
| 2007/0209891 | A1* | 9/2007 | Stensson | ............... F16D 65/183 |
| | | | | 188/247 |

FOREIGN PATENT DOCUMENTS

| | | |
|---|---|---|
| DE | 60122689 T2 | 9/2007 |
| DE | 112019005756 T5 | 8/2021 |
| EP | 1832777 B1 | 7/2008 |

* cited by examiner

*Primary Examiner* — Christopher P Schwartz
(74) *Attorney, Agent, or Firm* — Kristin L. Murphy (57) ABSTRACT

The present disclosure relates to a force transmission apparatus for a disc brake, The apparatus comprises an actuation element, a brake liner arrangement having a brake liner and a carrier plate, and a pressure element. The pressure element has a thickness which extends toward the actuation direction, a length extending in a tangential direction of an associated brake disc in an installed state and a width which extends in a radial direction of an associated brake disc in the installed state. The pressure element has a force input side operationally connected to the actuation element and a force output side. The force output side has contact regions spaced apart from each other and operationally connected to the carrier plate. The force output side has a region which is recessed into the pressure element. The recessed region has a first reinforcement web which connects the contact regions to each other such that the first reinforcement web is not recessed or is recessed less than the recessed region.

14 Claims, 8 Drawing Sheets

FORCE TRANSMISSION APPARATUS FOR A DISC BRAKE

CROSS-REFERENCE TO RELATED APPLICATION

This application claims priority to German Priority Application No. 102021213029.1, filed Nov. 19, 2021, the disclosure of which is Incorporated herein by reference in its entirety.

TECHNICAL FIELD

The disclosure relates to a force transmission apparatus for a disc brake of a motor vehicle. Furthermore, the disclosure relates to a disc brake having such a force transmission apparatus.

BACKGROUND

Using such a force transmission apparatus, an actuation force which is produced by the brake actuation in a brake system is transmitted to a brake liner which is thereby pressed against a brake disc. In modern disc brakes, for example in disc brakes in which the actuation force is produced electromechanically, actuation elements have a comparatively small cross sectional surface-area by means of which the actuation element presses against the brake liner. The actuation force thus acts only on a small, generally central region of the brake liner. From the prior art, solutions in which a pressure plate is arranged between a brake piston or a pressure piece and the brake liner, or the carrier plate of a brake liner are known. Such pressure plates acts in a pressure-distributing manner.

For example, EP 1 832 777 B1 discloses a disc brake having a pressure plate which is provided at the brake disc end of a pressure piece and which is connected to a brake liner retention member in a force-transmitting manner.

SUMMARY

What is needed is to optimise the force transmission of an actuation force which is introduced to a brake liner and an associated brake disc.

The force transmission apparatus according to the disclosure for a disc brake comprises an actuation element for producing and/or transmitting a brake force. Such an actuation element may be a brake piston which is hydraulically driven or a force output member of an electromechanical drive or transmission, or it may be an additional element which transmits the force of a brake piston or a force output member.

Furthermore, the force transmission apparatus comprises a brake liner arrangement having a brake liner and a carrier plate; and the force transmission apparatus comprises a pressure element for transmitting the brake force between the actuation element and the brake liner arrangement. The pressure element has a thickness to which extends in the direction of the actuation direction of the force transmission apparatus, a length $L_D$ which extends in the tangential direction T of an associated brake disc in the installed state and a width $B_D$ which extends in the radial direction R of an associated brake disc in the installed state.

The actuation direction is intended to be understood to refer to the movement path of the force transmission apparatus in which the force transmission apparatus moves when the brake is actuated or disengaged in the state installed in a disc brake. The tangential direction T is intended to be understood to refer to the orientation of the tangent of an associated brake disc, wherein the pressure element—when viewed in the actuation direction—overlaps the straight connection line from the tangent point and the circle centre of the brake disc, and in one exemplary arrangement, overlaps it in such a manner that the straight connection line extends substantially centrally through the pressure element.

The pressure element has a force input side which is operationally connected to the actuation element and a force output side, wherein the force output side has contact regions which are spaced apart from each other in the longitudinal direction of the pressure element and which are operationally connected to the carrier plate of the brake liner arrangement, and wherein the force output side has between the spaced-apart contact regions a region which is recessed into the pressure element with respect to the outer face of the spaced-apart contact regions. As a result of the recessed region, the pressure element is in this region thinner compared with the remaining thickness $t_D$, whereby a weight reduction is achieved and whereby in this region the pressure element has no direct contact with the carrier plate. It is advantageous that, as a result of the recessed region, the introduction of force which is carried out by the actuation element is not transmitted only at one location, for example in the carrier plate centre, to the carrier plate and consequently also to the brake liner centre, but instead the introduction of force is directed in a selective manner via the contact regions into the outer regions of the brake liner with respect to the tangential direction T. As a result of such an introduction of force to the brake liner, a particularly good brake power is achieved and there is a more favourable wear behaviour. As a result of the selective force distribution, a greater brake lever which acts on the brake disc is produced. This will be explained in greater detail below.

The recessed region has a first reinforcement web which connects the contact regions which are spaced apart from each other in such a manner that the first reinforcement web is not recessed or is recessed less than the recessed region. The reinforcement web ensures good rigidity or stability of the pressure element whose cross section is weakened by the recessed region. The reinforcement web is important with an actuation element having a small contact cross section, in order to achieve the most precisely determined force distribution possible. As a result of the integration of the reinforcement web, a compact construction type is achieved. In one exemplary arrangement, the reinforcement web does not protrude or at least does not protrude significantly over the remaining thickness to of the pressure element. The contact regions may, for example, be operationally connected to the carrier plate in such a manner that the outer face of the contact regions is in contact with the carrier plate or with an intermediate element of the carrier plate, for example, a damping layer of the carrier plate.

In one exemplary arrangement, the recessed region is constructed in a concave manner. In a further exemplary arrangement, the transitions from the contact regions into the recessed region are configured in a rounded manner. These measures result in an advantageous force path in the pressure element and an optimum material and weight reduction.

The recessed region has a length $L_R$ auf. Since the recessed region is arranged between the contact regions, $L_R$ is equal to the spacing of the contact regions with respect to each other. In one exemplary arrangement, the contact regions have in the longitudinal direction of the pressure element in each case a length $L_K$, wherein the length $L_R$ is greater than each individual length $L_K$. Preferably, the length $L_R$ is at least twice as large as each individual length $L_K$.

As a result of this configuration, the force introduced is displaced in a selective manner away from the centre in an outward direction and directed to eccentric regions in the brake liner. The lengths $L_K$ and $L_R$ extends in the same direction, that is to say, they are orientated in the same manner as the overall length $L_D$.

In one exemplary arrangement, the pressure element is constructed symmetrically in a tangential direction, wherein the recessed region forms the centre and the contact regions are in each case arranged at the outer ends of the pressure element.

In one exemplary arrangement, the pressure element has a first pressure element outer contour which extends in an advantageous exemplary arrangement in a curved or circular-arc-like manner. In the installed state, that is to say, in the installed state in a disc brake, this pressure element outer contour is orientated in the direction towards the outer diameter of an associated brake disc and the pressure element has a second pressure element outer contour which is opposite the first pressure element outer contour and which is arranged to be orientated towards the circle centre of an associated brake disc. The first reinforcement web extends in this instance along the first or the second pressure element outer contour.

As a result of this placement of the reinforcement web in the outer regions, an undesirable force transmission to the central region (with respect to the longitudinal extent of the brake liner arrangement, that is to say, in a tangential direction) of the brake liner arrangement is prevented. The recessed region may be configured freely, for example with respect to weight optimisation.

In an advantageous exemplary arrangement, the first reinforcement web has in cross section a web base which is connected to the body of the pressure element, a web inner side which is arranged to be orientated in the direction towards the recessed region, a web outer side which is arranged to be orientated in the direction towards the first or the second pressure element outer contour and a web rear which is arranged to be orientated in the direction towards the brake liner arrangement and which connects the web outer side and the web inner side. The width of the web rear is at least partially constant between the contact regions which are spaced apart from each other. In one exemplary arrangement, the width of the web rear is constant over the entire length thereof. This simplifies the production and also contributes to preventing an undesirable force transmission in the central region of the brake liner arrangement.

The web rear may form a rounded portion or a radius in cross section partially, and in one exemplary arrangement, over the entire length thereof, between the contact regions which are spaced apart from each other between the web outer side and the web inner side. The web rear width is then minimal and constructed in principle as a line.

In one exemplary arrangement, the web outer side extends partially, and in one exemplary arrangement, over the entire length thereof, between the contact regions which are spaced apart from each other flush with the first or the second pressure element outer contour.

The web inner side may extend partially, or over the entire length thereof, between the contact regions which are spaced apart from each other, in such an oblique manner that the spacing between the web outer side and the web inner side increases starting from the web rear in the direction of the web base.

In one exemplary arrangement, the carrier plate of the brake liner arrangement and the pressure element are arranged so as to overlap in such a manner that the outer contours thereof extend at least partially in a congruent manner. In one exemplary arrangement, the carrier plate also has a first carrier plate outer contour which extends in a congruent manner with the first pressure element outer contour. Additionally, or alternatively, a second carrier plate outer contour extends partially in a congruent manner with the second pressure element outer contour.

In one exemplary arrangement, the recessed region has a second reinforcement web which has the above-mentioned features of the first reinforcement web and wherein the second reinforcement web extends along the pressure element outer contour which is not occupied by the first reinforcement web. That is to say, when the first reinforcement web extends along the first pressure element outer contour, the second reinforcement web consequently extends along the second pressure element outer contour. When the first reinforcement web extends along the second pressure element outer contour, the second reinforcement web consequently extends along the first pressure element outer contour. As a result of this dual arrangement, the above-mentioned effects of the stability of the pressure element and the ways of configuring the recessed region are further increased.

In one exemplary arrangement, the carrier plate is configured in such a manner that it is in contact with the contact regions of the pressure element and it has no contact with the web rears. As already explained above, the prevention of contact in the central region of the brake liner arrangement promotes a defined distribution of the active actuation force over the contact regions, that is to say, in eccentric regions of the brake liner arrangement or the brake liner. The described possible cross sectional geometry of the reinforcement webs, promotes the production of exemplary arrangements of the force transmission apparatus in which contact between web rears and the carrier plate is prevented.

In one exemplary arrangement, the carrier plate has a thickness reduction in the region or in the regions in which it overlaps the reinforcement web or the reinforcement webs. As a result of this property, the contact between the web rear(s) and the carrier plate is prevented. A thickness reduction is carried out only at locations where a reinforcement web or a web rear extends directly. With a reinforcement web with a small web rear width, the thickness reduction has to take up only a small amount of the carrier plate surface and consequently has to weaken the carrier plate only slightly.

In one exemplary arrangement, the thickness reduction is in the form of a chamfer or a radius which extends along the carrier plate outer contour.

The brake liner may have a recess so that in a tangential direction two brake liner portions, and in one exemplary arrangement, two symmetrically constructed brake liner portions, are formed. Such a division supports the distribution of the actuation force over the eccentric regions of the brake liner.

As an alternative to contact regions which in the longitudinal direction have such an extent that they together with the width extent thereof form a pronounced outer face which can visually also be readily identified as a surface, the contact regions may also be constructed in a web-like manner. Other properties of the force transmission apparatus correspond in this instance to the above-explained configuration options. Such a web-like configuration may be such that the outer faces, which face the brake liner arrangement, of the web-like contact regions form a linear contact. That is to say, the respective length $L_K$ of the contact regions is in this instance so small that in place of contact faces, contact lines are virtually present. In this alternative exemplary arrangement, the web-like contact regions form a circumferential web together with the reinforcement webs.

In one exemplary arrangement, the web-like contact regions extend in this instance along the side edges of the pressure element which connect the pressure element outer contours. The configuration of the contact regions in the form of a web contributes to reducing the weight of the pressure element and consequently of the force transmission apparatus. The web form is also a suitable measure for directing the actuation force to be transmitted to defined locations of the brake liner. In one exemplary arrangement, the outer faces, facing the brake liner arrangement, of the web-like contact regions and the web rears of the reinforcement webs extend in a plane which limits the pressure element in terms of the thickness to thereof at the force output side. The reinforcement webs which connect the contact regions to each other and the contact regions themselves, when they are constructed in a web-like manner, may have the same cross sectional geometry. This simplifies the production.

The disc brake according to the disclosure comprises a force transmission apparatus which is constructed in accordance with the exemplary arrangements described above. The pressure element has a thickness to which extends in the direction of the actuation direction of the force transmission apparatus, a length $L_D$ which extends in a tangential direction T of the brake disc and a width $B_D$ which extends in a radial direction R of the brake disc.

BRIEF DESCRIPTION OF DRAWINGS

The disclosure is explained in greater detail below with reference to the exemplary arrangements shown in the Figures, in which:

FIGS. 1 to 7 show a first exemplary arrangement of a force transmission apparatus.

FIG. 11 shows effective force zones in a brake liner with a pressure element according to the;

FIGS. 12 to 18 show a second exemplary arrangement of the force transmission apparatus;

DETAILED DESCRIPTION

Components which are repeated are not indicated separately in each Figure.

Figure 1:
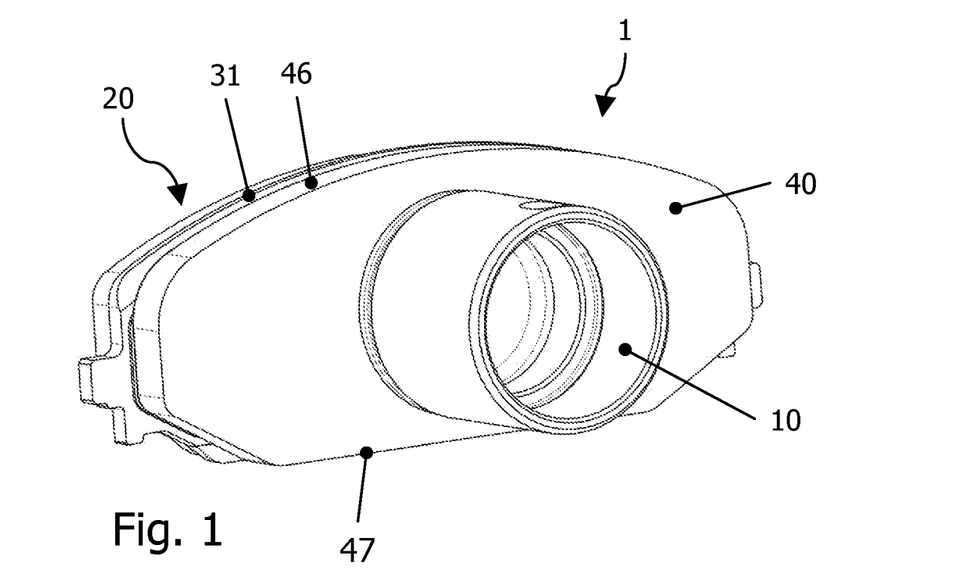
FIG. 1 shows a perspective view of the force transmission apparatus.
Figure 2:
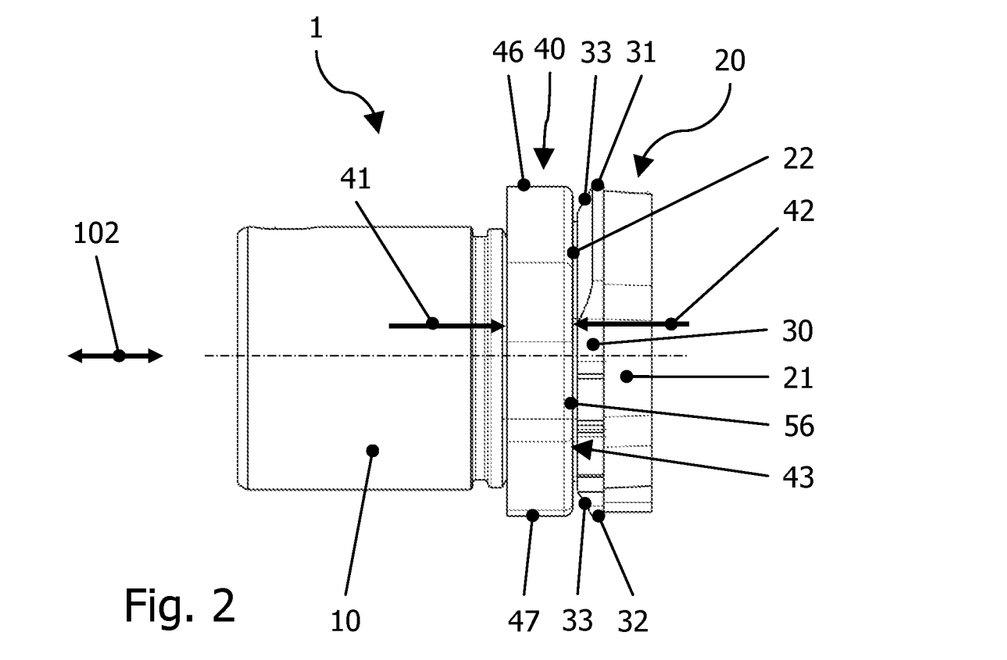
FIG. 2 shows a side view of the force transmission apparatus.
Figure 3:
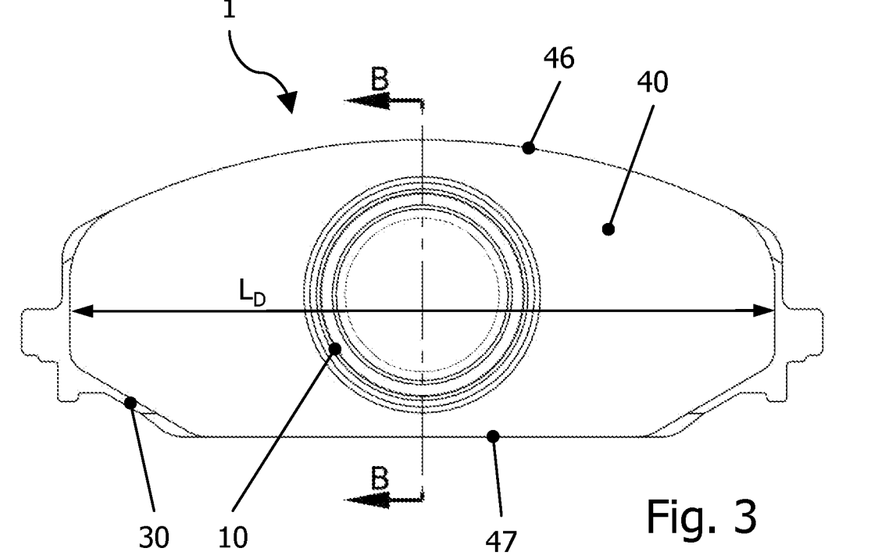
FIG. 3 shows a view from the rear of the force transmission apparatus.

A first exemplary arrangement of a force transmission apparatus according to the disclosure:

FIGS. 1 to 3 show the force transmission apparatus 1 according to the disclosure from the rear side. That is to say, it is an actuation element 10 which at the force input side 41 of the pressure element 40 abuts centrally therewith. The introduction of force during operation and in the event of a brake actuation is thus carried out in a small surface portion of the force input side 41 compared with the entire surface-area of the force input side 41. At the force output side 42 of the pressure element 40 opposite the force input side 41, the brake liner arrangement 20 can be partially seen in FIG. 1.

The arrangement of the components is also shown in FIG. 2 as a side view. The pressure element 40 abuts with two contact regions 43, for example with the outer faces 56 thereof, the carrier plate 30 of the brake liner arrangement 20, for example an intermediate layer or damping layer 22 of the carrier plate 30. The actuation direction 102 of the force transmission apparatus 1 is also illustrated in FIG. 2.

FIG. 3 shows that the pressure element 40 has a first pressure element outer contour 46 and a second pressure element outer contour 47 which is opposite the first pressure element outer contour 46. The first pressure element outer contour 46 extends in a circular-arc-like manner and faces the outer diameter of an associated brake disc 101 in the state installed in a disc brake 100. The second pressure element outer contour 47 extends in a linear manner and faces the brake disc centre 103 of the associated brake disc 101 in the installed state. The carrier plate 30 has a first carrier plate outer contour 31 which extends in a congruent manner with the first pressure element outer contour 46, and a second carrier plate outer contour 32 which extends partially in a congruent manner with the second pressure element outer contour 47.

Figure 4:
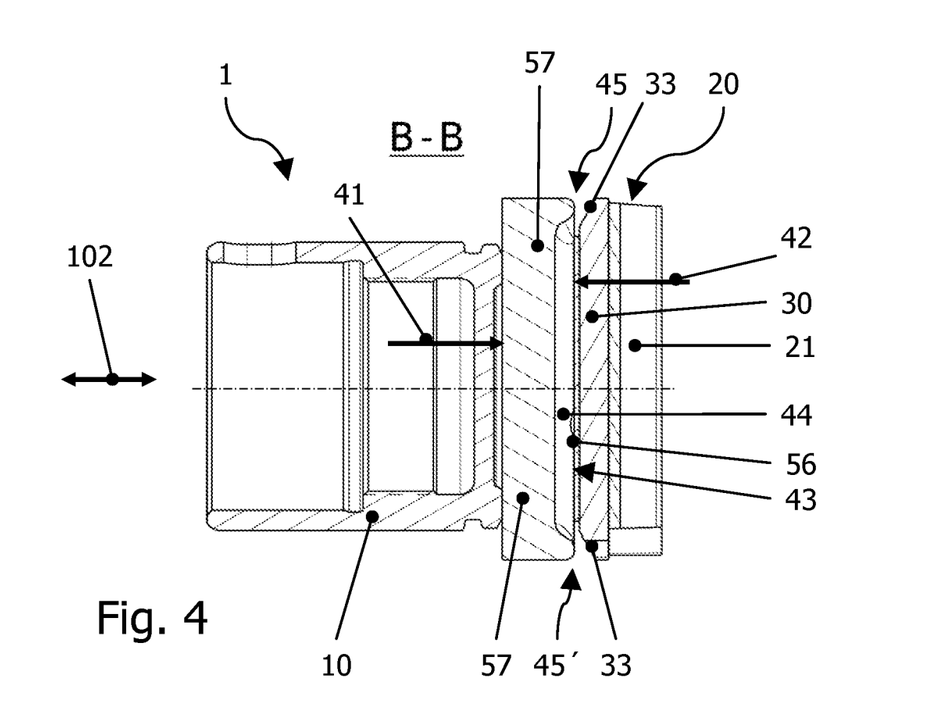
FIG. 4 shows a sectioned view of the force transmission apparatus.

FIG. 4 shows in the contact region of the pressure element 40 and the carrier plate 30 a recessed region 44 of the pressure element 40. At locations where the recessed region 44 is recessed behind the contact region outer face 56, the pressure element 40 does not touch the carrier plate 30. A reinforcement web 45, 45' extends in each case along the first and the second pressure element outer contour 46, 47. The reinforcement webs 45, 45' extend flush with the respective pressure element outer contour 46, 47. At locations where the carrier plate 30, with the carrier plate outer contour 31, 32, extends in a congruent manner with the reinforcement webs 45, 45', the carrier plate 30 has along the carrier plate outer contour 31, 32 thereof a thickness reduction in the form of a chamber 33. The pressure element 40 thereby has no contact with the carrier plate 30 in these regions. Contact between the pressure element 40 and carrier plate 30 is produced only where it is intended, that is to say, exclusively in the contact regions 43.

Figure 5:
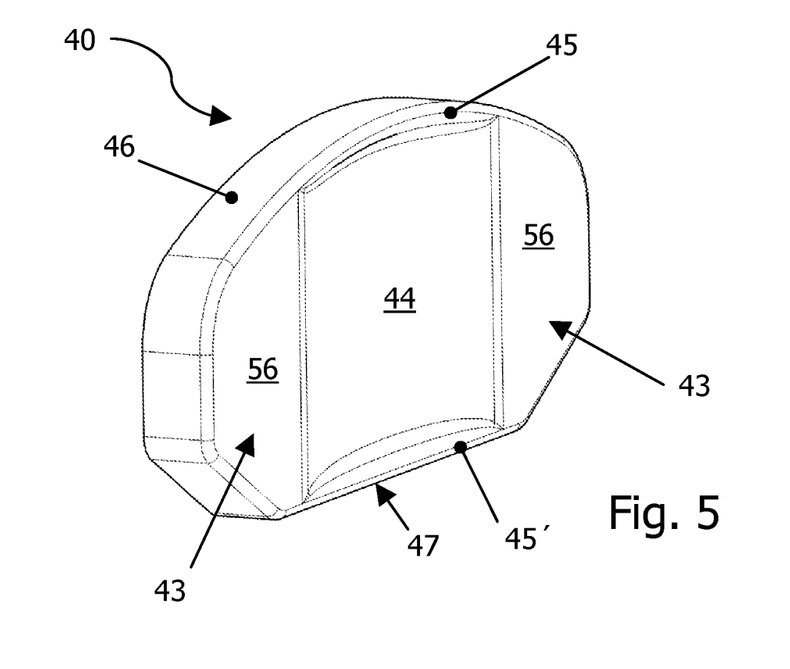
FIG. 5 shows a perspective view of the pressure element.
Figure 6:
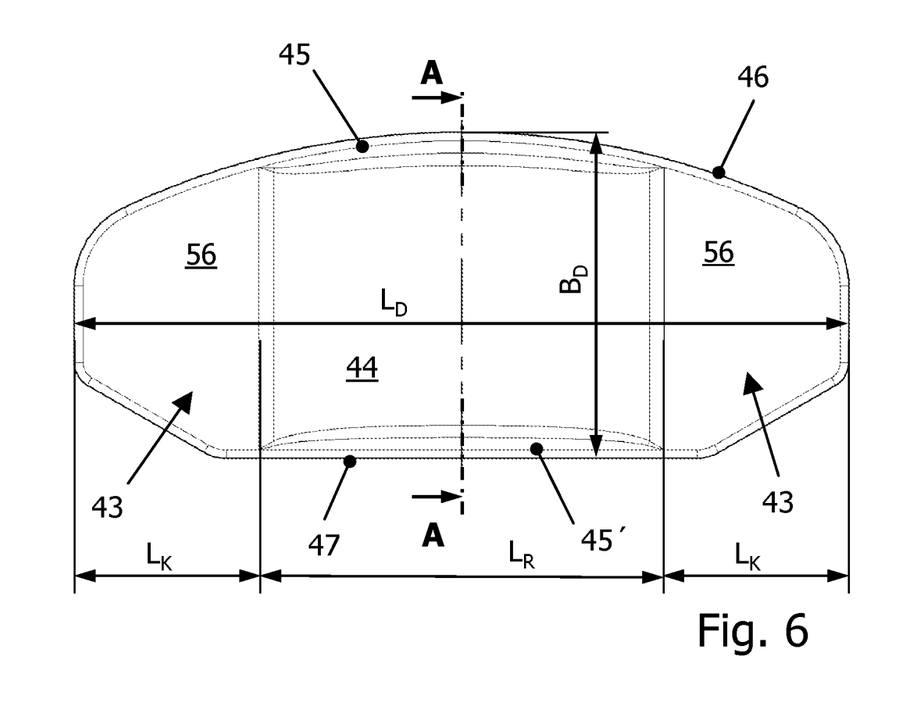
FIG. 6 shows a front view of the pressure element.
Figure 7:
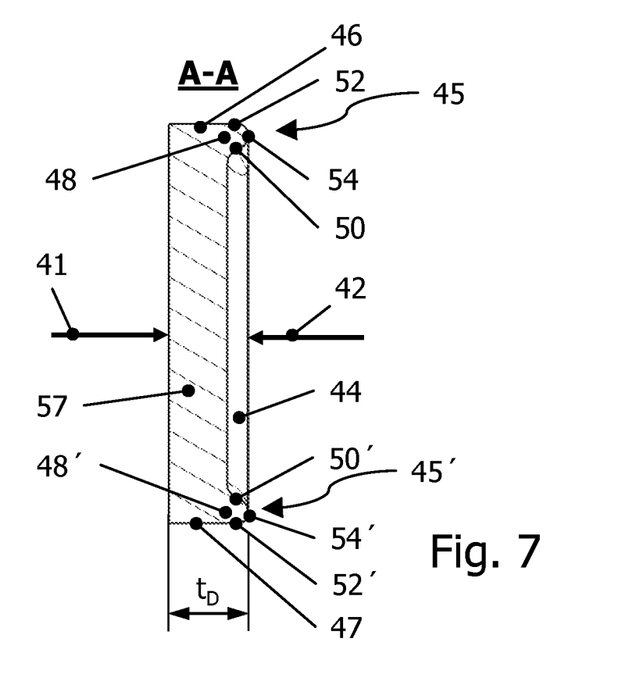
FIG. 7 shows a sectioned view of the pressure element.

The path and the shape of the reinforcement webs 45, 45' can be seen in FIGS. 5 to 7. FIG. 5 shows that the contact regions 43 in each case have the outer face 56. These faces are in contact with the carrier plate 30 or with the damping layer 22 of the carrier plate 30 (see FIGS. 1 to 4). The recessed region 44 is recessed behind the outer faces 56 into the body 57 of the pressure element 40 and thus forms a depression. The reinforcement webs 45, 45' extend in each case along the first pressure element outer contour 46 and along the second pressure element outer contour 47 and in each case connect the contact regions 43. The reinforcement webs 45, 45' are connected integrally to the pressure element 40 and are positioned with a web base 48, 48' on the body 57. The web outer sides 52, 52' thereof extend in each case flush with the pressure element outer contours 46, 47. The web inner sides 50, 50' extend in each case starting from the body 57 in an oblique manner, in a manner tapering the web, in the direction towards the web rears 54, 54' which terminate the webs in each case in an outward direction. The web rears 54, 54' form when viewed in cross section a radius which in each case connects the web outer side 52, 52' and the web inner side 50, 50'. The web rears 54, 54' extend in a plane with the contact region outer faces 56. It is advantageous in this instance that the reinforcement webs 45, 45' do not increase the thickness $t_D$ of the pressure element. As a result of the positioning and integration of the reinforcement webs 45, 45' at the force output side, stabilisation elements can be prevented in other regions or components. For example, with the carrier plate 30 which forms a wear component together with the brake liner 21, material can be saved. Nonetheless, the desired effect of the force distribution is achieved by the reinforcement web(s) 45, 45'.

The pressure element 40 has a length $L_D$, a width $B_D$ and a thickness $t_D$. In the longitudinal direction, the contact regions 43 are arranged spaced apart from each other with a spacing $L_R$. Between the contact regions which in the longitudinal direction of the pressure element 40 (that is to say, in a tangential direction T with respect to an associated brake disc 101) in each case have a length $L_K$, the recessed region 44 which consequently also has the length $L_R$ is located. The transitions between the different thickness regions (for example, from the contact region outer face 56 to the recessed region 44) are provided with radii or with tangential transitions. The depth of the recess of the recessed region 44 may be from 2 to 6 mm, for example from 3 to 5 mm.

Figure 8:
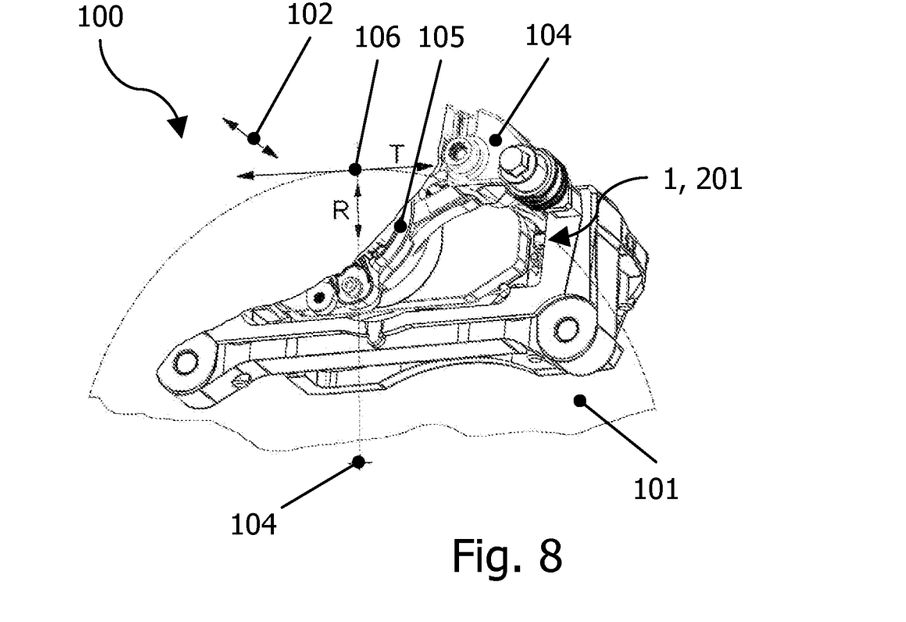
FIG. 8 shows a perspective partial view of the disc brake.

An exemplary arrangement of the disc brake according to the disclosure:

FIG. 8 shows a disc brake 100 according to the disclosure with a corresponding force transmission apparatus 1. Of the disc brake 100, only a cut-out is illustrated. The brake disc 101 is only indicated and also illustrated as a cut-out. It can be seen that the force transmission apparatus 1 which is also illustrated as a cut-out is received in a sliding caliper 104. As a result of an electromechanical drive, the force transmission apparatus 1 is actuated in an actuation direction 102. That is to say, during a braking operation, the force transmission apparatus 1 is moved in the direction of the brake disc 101. When the brake is disengaged, the force transmission apparatus 1 is moved away from the brake disc 101. The tangential direction T of the brake disc 101 is indicated centrally above the force transmission apparatus 1 or centrally over the pressure element 40. In the direction of this tangential direction T or in the direction of the parallel lines thereof, the pressure element 40 has a longitudinal extent having a length $t_D$. The radial direction R is produced by a straight connection line through the tangent location 106 and the brake disc centre 104.

Figure 9:
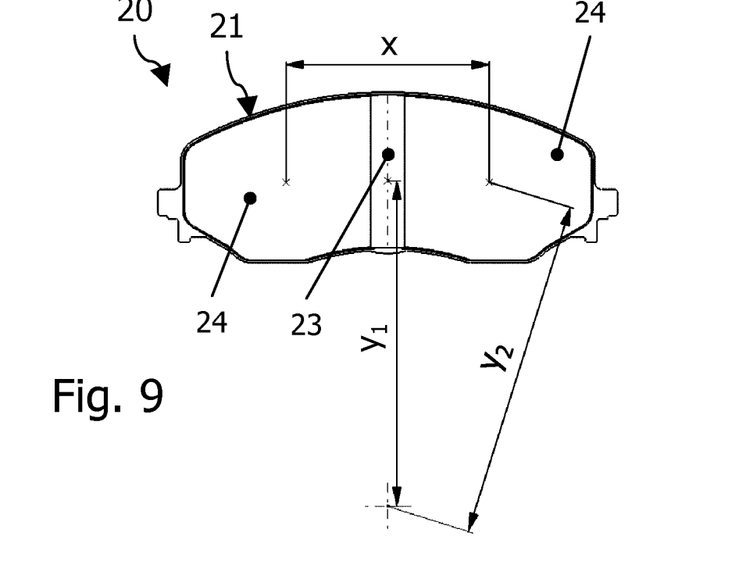
FIG. 9 shows a brake liner having comparable effective force positions.

Force Distribution According to the Disclosure:

FIG. 9 shows a brake liner arrangement 20 with a view of the brake liner 21. In the centre of the brake liner 21 is a brake liner recess 23 which extends in a radial direction. The brake liner 21 is thereby divided into two symmetrically constructed brake liner regions 24.

In FIG. 9, it is illustrated by way of comparison that, as a result of the selective displacement of the centrally introduced actuation force into the outer regions of the brake liner, the force engagement on the brake disc 101 moves further away from the brake disc centre 103. The brake disc 101 thereby acts with a larger lever arm. The effective lever arm is designated $y_1$ and $y_2$. $y_1$ is the lever arm which is produced without the pressure element 40 according to the disclosure, that is to say, in a plate-like configuration of the pressure element without any recessed region and without reinforcement webs. As a result of the configuration of the pressure element 40 according to the disclosure, the otherwise one central effective force location is divided over two outwardly displaced effective force locations. As a result of the fact that the displacement is not carried out along a circular path but instead along a tangent or a tangential parallel, the lever arm or the lever arms increase(s). That is to say, $y_2$ is greater than $y_1$. This has a positive effect on the brake power. Furthermore, the wear behaviour is optimised as a result of the division of the application of force by a more uniform wear.

Figure 10:
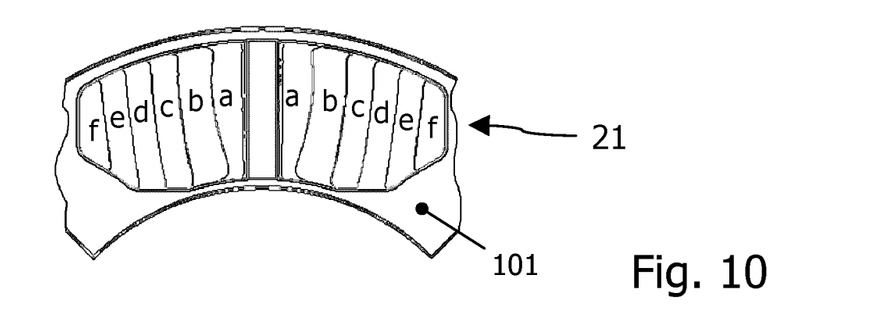
FIG. 10 shows effective force zones in a brake liner without a pressure element according to the disclosure.
Figure 11:
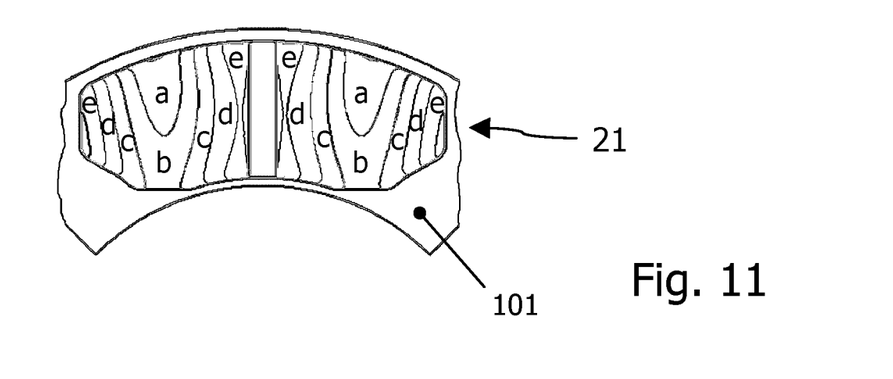

FIGS. 10 and 11 also illustrate by way of comparison the pressure distribution which is produced by a different configuration of the pressure element 40 and which can be demonstrated by corresponding tests.

FIG. 10 shows the pressure distribution when a plate-like pressure element 40 is used without a recessed region and without reinforcement webs. The various pressure regions are illustrated by the pressure zones which are denoted with the lower case letters a to f. In this instance, the highest pressure force (application of force) acts on the region designated a and gradually in accordance with the sequence of letters the lowest pressure force acts on the region designated f. It can thus be seen that, when a conventional pressure element 40 is used, the pressure force is highest in the brake liner centre and the pressure force continuously decreases in the direction of the edge regions of the brake liner.

FIG. 11 shows the pressure distribution when a pressure element 40 according to the disclosure is used. In this instance, it can be seen that the highest pressure force has been displaced into the optimum regions designated a. Towards the centre and further outwards, the pressure force decreases. Particularly in the regions designated a, a favourable application of force is achieved on the brake disc 101 with a greater lever. A higher brake power is thereby achieved.

A second exemplary arrangement of the force transmission apparatus according to the disclosure:

The construction of the second exemplary arrangement substantially corresponds to that of the first exemplary arrangement. For this reason, the following description concentrates on the different properties. Identical components are denoted in FIGS. 12 to 18 with, in comparison with the first embodiment, the same numbers in the single-digit and double-digit range but increased in the second exemplary arrangement by 200.

Figures 12, 13:
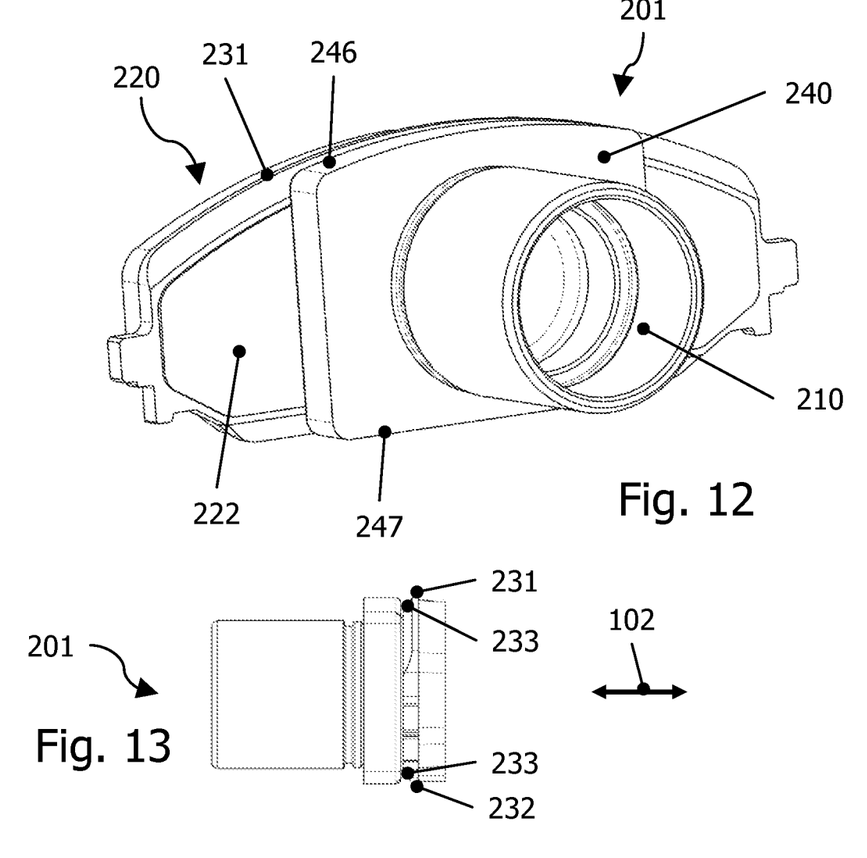
FIG. 12 shows a perspective view of the force transmission apparatus.
FIG. 13 shows a side view of the force transmission apparatus.
Figure 14:
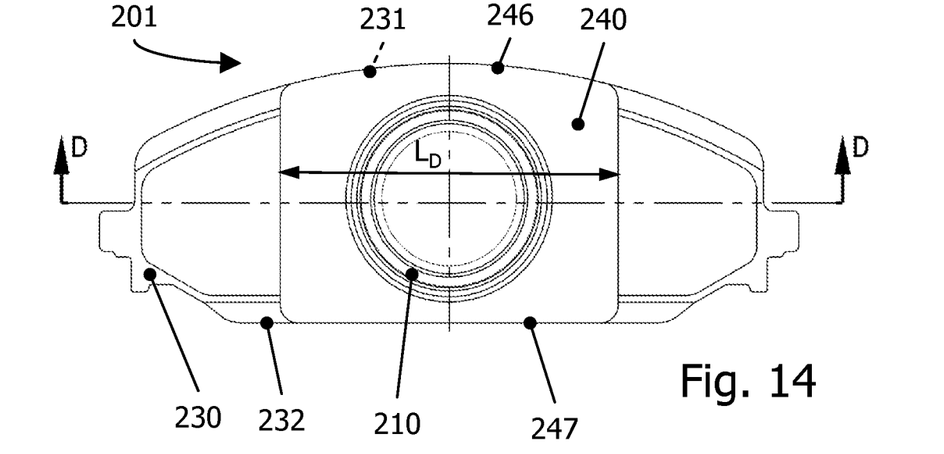
FIG. 14 shows a view from the rear of the force transmission apparatus.

FIG. 12 and FIG. 13 show that the length $L_D$ of the pressure element 240 is significantly smaller than the length of the brake liner arrangement 220. That is to say, the carrier plate 30 is only partially overlapped by the pressure element 240. At locations where the pressure element 240 does not overlap the carrier plate 30, the damping layer 222 appears. The first pressure element outer contour 246 and the first carrier plate outer contour 231 extend in a congruent manner. The second pressure element outer contour 247 and the second carrier plate outer contour 232 also extend in a congruent manner.

Figure 15:
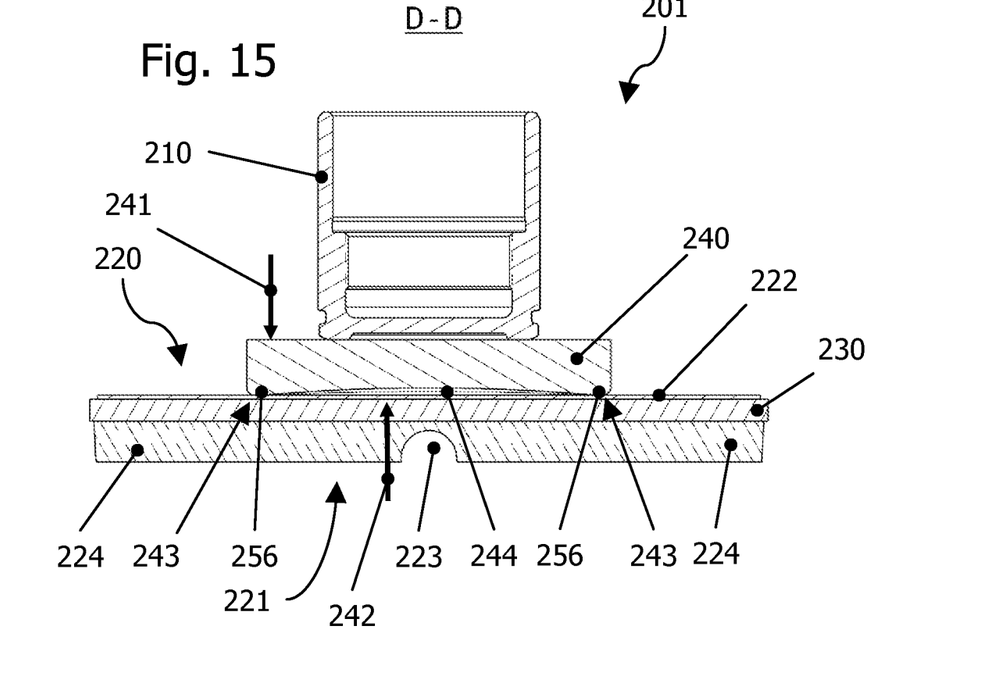
FIG. 15 shows a sectioned view of the force transmission apparatus.

FIG. 15 shows that the brake liner 221 as a result of the recess 223 is subdivided into two brake liner regions 224. It can further be seen that, in the longitudinal direction of the pressure element, or along the tangential direction T, the pressure element 240 has at the force output side 242 between two web-like contact regions 243 which are placed on the edges a concave recessed region 244. The contact regions 243 abut with a linear contact 256 the damping layer 222 of the carrier plate 230.

Figure 16:
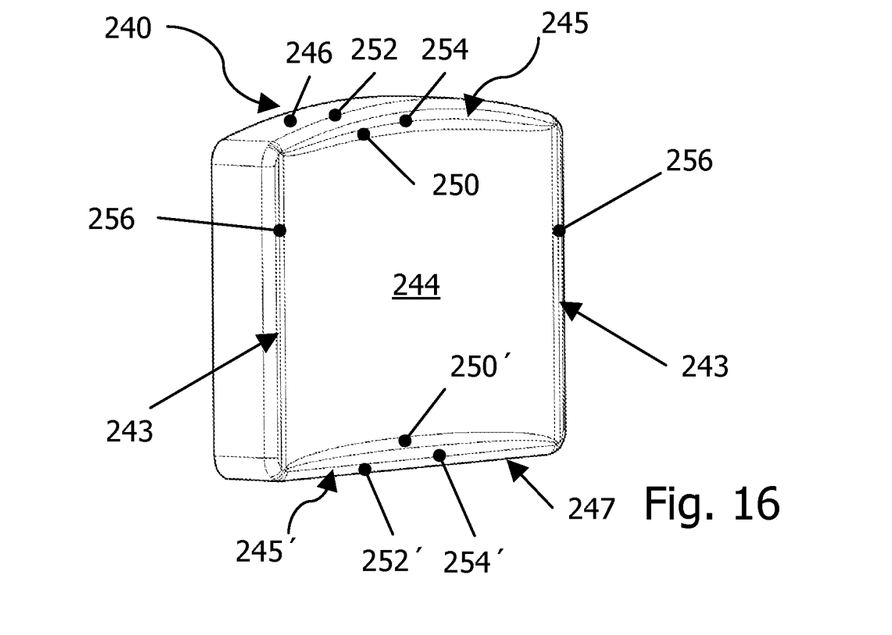
FIG. 16 shows a perspective view of the pressure element.
Figure 17:
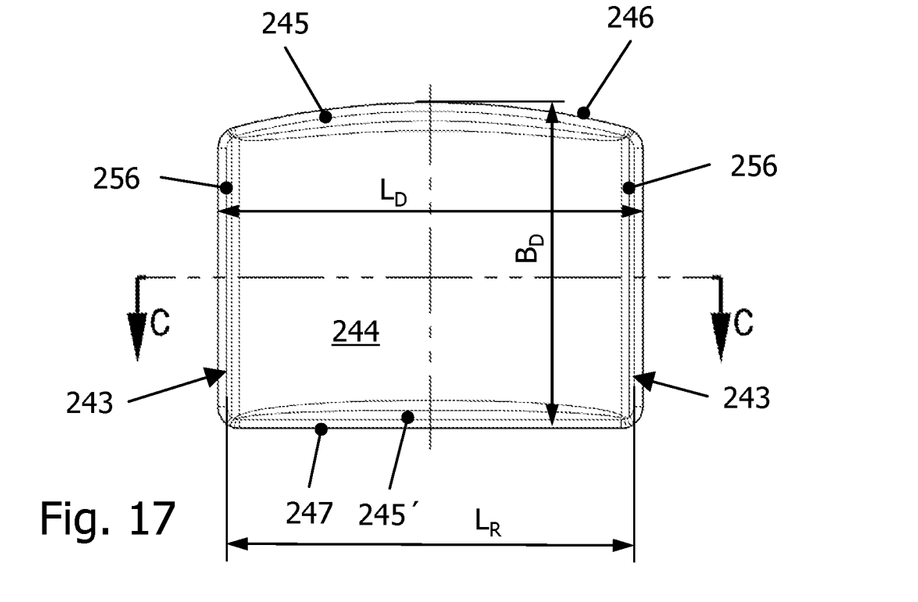
FIG. 17 shows a front view of the pressure element.
Figure 18:
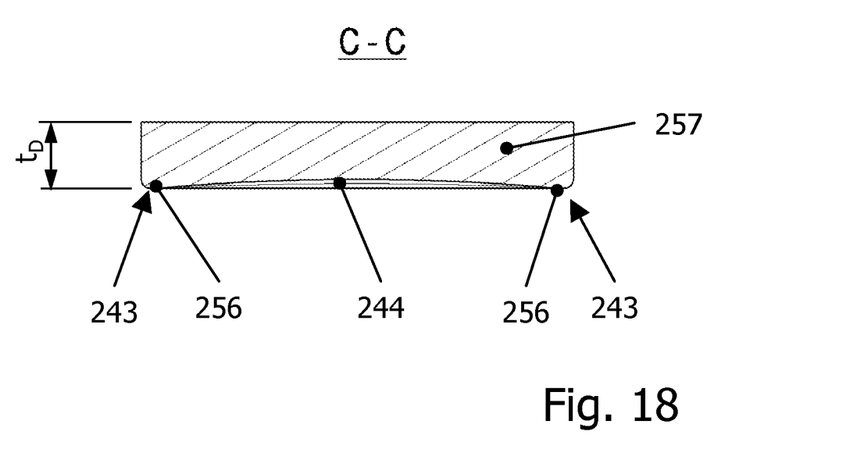
FIG. 18 shows a sectioned view of the pressure element.

FIGS. 16 to 18 show the geometry of the pressure piece.

The invention claimed is:

1. A force transmission apparatus for a disc brake, comprising:
    an actuation element for producing and/or transmitting a brake force,
    a brake liner arrangement having a brake liner and a carrier plate,
    a pressure element for transmitting the brake force between the actuation element and the brake liner arrangement,
    wherein the pressure element has a thickness which extends in a direction of an actuation direction of the force transmission apparatus, a length which extends in a tangential direction of an associated brake disc in an installed state and a width which extends in a radial direction of an associated brake disc in an installed state,
    wherein the pressure element has a force input side which is operationally connected to the actuation element and a force output side,
    wherein the force output side has contact regions which are spaced apart from each other in a longitudinal direction of the pressure element and which are operationally connected to the carrier plate of the brake liner arrangement,
    wherein the force output side has between the spaced-apart contact regions a region which is recessed into the pressure element with respect to the outer face of the spaced-apart contact regions,
    wherein the recessed region has a first reinforcement web which connects the mutually spaced-apart contact regions to each other in such a manner that the first reinforcement web is not recessed or is recessed less than the recessed region.

2. The force transmission apparatus according to claim 1, wherein the recessed region is constructed in a concave manner.

3. The force transmission apparatus according to claim 1, wherein the recessed region has a length,
    wherein the contact regions have in the longitudinal direction of the pressure element a length, and wherein the length is greater than each individual length.

4. The force transmission apparatus according to claim 1, wherein the pressure element has a first pressure element outer contour, which extends in a curved manner and which in an installed state is arranged to be orientated in a direction towards an outer diameter of an associated brake disc, and a second pressure element outer contour which is opposite the first pressure element outer contour and which in the installed state is arranged to be orientated towards a circle centre of an associated brake disc,
    wherein the first reinforcement web extends along the first or the second outer contour.

5. The force transmission apparatus according to claim 4, wherein the first reinforcement web has in cross section a web base, which is connected to a body of the pressure element, a web inner side which is arranged to be orientated in a direction towards the recessed region, a web outer side, which is arranged to be orientated in a direction towards the first or the second pressure element outer contour and a web rear which is arranged to be orientated in the direction towards the brake liner arrangement and which connects the web outer side and the web inner side,
    wherein the width of the web rear is at least partially constant, between the mutually spaced-apart contact regions.

6. The force transmission apparatus according to claim 5, wherein the web rear forms a rounded portion over the entire length thereof, between the mutually spaced-apart contact regions between the web outer side and the web inner side, and/or
    wherein the web outer side at least partially, between the mutually spaced-apart contact regions extends flush with the first or the second pressure element outer contour and/or
    wherein the web inner side at least partially, between the mutually spaced-apart contact regions extends in such an oblique manner that the spacing between the web outer side and the web inner side increases starting from the web rear in the direction of the web base.

7. The force transmission apparatus according to claim 4, wherein the carrier plate and the pressure element are arranged so as to overlap in such a manner that the outer contours thereof extend at least partially in a congruent manner,
    and/or the carrier plate has a second carrier plate outer contour which extends partially in a congruent manner with the second pressure element outer contour.

8. The force transmission apparatus according to claim 1, wherein the recessed region has a second reinforcement web which has the features of the first reinforcement web, and
    wherein the second reinforcement web extends along the pressure element outer contour which is not occupied by the first reinforcement web.

9. The force transmission apparatus according to claim 8, wherein the contact regions are constructed in a web-like manner, such that the outer faces thereof facing the brake liner arrangement form a linear contact.

10. The force transmission apparatus according to claim 9, wherein the web-like contact regions form a circumferential web together with the reinforcement webs.

11. The force transmission apparatus according to claim 1, wherein the carrier plate is configured in such a manner that it is in contact with the contact regions of the pressure element, with the outer faces thereof, and the carrier plate has no contact with the reinforcement webs.

12. The force transmission apparatus according to claim 1, wherein the carrier plate in the region or in the regions in which it overlaps the reinforcement web has a thickness reduction, which extends along a carrier plate outer contour or a thickness reduction which is in the form of a radius which extends along the carrier plate outer contour.

13. The force transmission apparatus according to claim 1, wherein the brake liner has a recess so that in a tangential direction two brake liner portions, are formed.

14. A disc brake having a force transmission apparatus according to claim 1, wherein the pressure element has a thickness which extends in a direction of the actuation direction of the force transmission apparatus, a length which extends in the tangential direction of the brake disc and a width, which extends in a radial direction of the brake disc.

\* \* \* \* \*